United States Patent [19]

Jackson

[11] Patent Number: 5,319,685
[45] Date of Patent: Jun. 7, 1994

[54] METHOD FOR OPERATION OF A BOILING WATER NUCLEAR REACTOR

[75] Inventor: Anders Jackson, Västerås, Sweden
[73] Assignee: ABB Atom AB, Västerås, Sweden
[21] Appl. No.: 51,148
[22] Filed: Apr. 22, 1993
[30] Foreign Application Priority Data
Apr. 29, 1992 [SE] Sweden .................................. 9201345
[51] Int. Cl.$^5$ ............................................... G21C 5/00
[52] U.S. Cl. ...................................... 376/267; 376/435
[58] Field of Search ................. 376/267, 435, 444, 214
[56] References Cited
U.S. PATENT DOCUMENTS 4,348,355  9/1982  Nylund ................................. 376/444
4,795,608  1/1989  Nylund ................................. 376/444

FOREIGN PATENT DOCUMENTS 62-96889  5/1987  Japan ................................... 376/267

Primary Examiner—Daniel D. Wasil
Attorney, Agent, or Firm—Watson, Cole, Grindle & Watson

[57] ABSTRACT

A nuclear reactor of boiling water type has a reactor core including a plurality of vertical fuel assemblies (30, 30a) of substantially square cross section arranged in a lattice, with each fuel assembly included in two rows of fuel assemblies, perpendicular to each other and separated by intermediate water gaps (27a, 27b). Each fuel assembly comprises two vertical perpendicular sides, each side facing a water gap which has a larger width than a water gap toward which the opposite two vertical perpendicular sides face. After an operating cycle for the reactor of at least two years, the majority of the fuel assemblies used during the completed operating cycle, which are located in an edge zone (25) furthest out in the core, are turned 180 degrees around the vertical center line of the respective fuel assembly, and the turned fuel assemblies are used for a following operating cycle of the reactor.

5 Claims, 7 Drawing Sheets

METHOD FOR OPERATION OF A BOILING WATER NUCLEAR REACTOR

BACKGROUND OF THE INVENTION

The present invention relates to a method for operation of a nuclear reactor of boiling water type with a reactor core comprising a plurality of vertical fuel assemblies of substantially square cross section, arranged in a lattice with each fuel assembly included in two rows of fuel assemblies, perpendicular to each other and separated by intermediate water gaps, and wherein each one of two vertical sides of a fuel assembly, which are perpendicular to each other, is facing towards a water gap which has a larger width than the water gap towards which its opposite vertical side is facing. Each fuel assembly contains a plurality of vertically arranged fuel rods. The core also contains a large number of control rods, which may each comprise four vertically arranged blades provided with a neutron absorber, which blades form a perpendicular cross and which are adapted to be insertable into the wide water gaps between the fuel assemblies but not into the narrow water gaps.

When the burnup in a reactor of the above-mentioned kind has progressed so far that the smallest acceptable core reactivity margin has been attained, a partial recharge is carried out. By balancing in a suitable way how much fuel that is to be replaced as well as the enrichment of the replacement fuel, an excess reactivity is obtained which permits a certain energy output until the next refuelling. During the partial recharge, one-fifth of the fuel, for example, can be replaced every operating year (or any other suitable operating cycle) as from the end of the second operating year. This means that the fuel in the exemplified case remains in the core for five years during steady state, but that part of the fuel which is replaced during the initial stage is used for a shorter period of time.

Refuelling is performed in such a way that fuel assemblies are withdrawn from the core and fuel assemblies with fresh fuel, usually after appropriate relocation of remaining fuel assemblies within the core, are inserted into the empty spaces arising. The relocation of fuel assemblies is carried out in order to achieve optimum power distribution within the reactor core and optimum reactivity.

In reactors of the kind stated, the enrichment distribution in the fuel assemblies is normally uneven. High enrichments, that is, fuel rods with a high content of fissile material, are placed along the narrow water gap, where the moderation is poorest and low enrichments, that is, fuel rods with a low content of fissile material, along the wider water gap, where the moderation is good. This is necessary for the performance with respect to the thermal margins to be good when the fuel assembly is relatively fresh and has a high power. By thermal margins are meant in this case primarily margins with respect to dryout, that is, with respect to powers where there is a risk of water films breaking down on fuel rods in the fuel assembly, and margins with respect to powers where there is a risk that the linear power density of the fuel rods gives rise to damage on the cladding which surrounds the nuclear fuel material as a consequence of the occurrence of swelling of the nuclear fuel material.

SUMMARY OF THE INVENTION

The present invention is based on the realization that considerable savings in fuel costs can be made by turning certain fuel assemblies, used during an operating cycle, 180° around the vertical axis of the respective fuel assembly and using them during the following operating cycle without jeopardizing the maintenance of the thermal margins mentioned above, and while at the same time fulfilling the requirements for other critical factors for the operation of the reactor, such as internal form factor and shutdown margin. By turning the fuel assemblies, a considerable gain in reactivity can be made since high enrichments will then be facing a wide water gap.

What characterizes the invention is that, after an operating time for the reactor of at least two years, at least the main part of those fuel assemblies used during the operating cycle, which are located in or which after the operating cycle are moved to an edge zone located furthest out in the core, are turned 180° around the vertical centre line of the respective fuel assembly, the edge zone extending around the core and comprising the three fuel assemblies located furthest out in the core, and that the fuel assemblies thus turned are used for a following operating cycle for the reactor. In the above-mentioned edge zone there are assemblies, some of them possibly after relocation within the core, which have sufficiently high burnup and deliver sufficiently low power to be able to be turned. Also occasional fuel assemblies, which are located inside the edge zone and which have a high burnup and a low power, may be able to be turned without jeopardizing the operation of the reactor.

It is particularly suitable to perform the turning of the fuel assemblies in connection with a partial recharge of the reactor. During such recharge, as mentioned above, some of the fuel assemblies used during the completed operating cycle are replaced by fresh fuel assemblies and some are relocated into new positions in the core.

According to a preferred embodiment of the invention, the invention is applied to a reactor where each fuel assembly is composed of four vertical sub-assemblies, which are separated by a vertical water channel with a substantially cruciform cross section. Especially favourable results are obtained with fuel assemblies of the kind mentioned if each sub-assembly consists of 25 fuel rods and any non-energy producing rods occurring, arranged in a lattice of 5×5 rods or of 24 fuel rods and any non-energy producing rods occurring, arranged in a lattice of 5×5 rods but with that rod removed which is located nearest to the centre line of the cruciform water channel to achieve an enlarged centre in the water channel. When using fuel assemblies with such a large number of fuel rods, the heat transfer surface of the fuel rods for a given quantity of fuel will be relatively large, which increases the possibilities of utilizing the results which are obtainable according to the present invention. According to other suitable embodiments of the invention, each fuel assembly may, inter alia, consist of 9×9, 10×10 or 11×11 fuel rods, or possibly more fuel rods without being divided into sub-assemblies.

BRIEF DESCRIPTION OF THE DRAWINGS

The invention will be explained in greater detail by describing an embodiment with reference to the accompanying drawing, wherein

FIGS. 5, 6 and 7 are shown on a larger scale than FIGS. 2 and 8.

DETAILED DESCRIPTION OF THE PREFERRED EMBODIMENT

Figure 1:
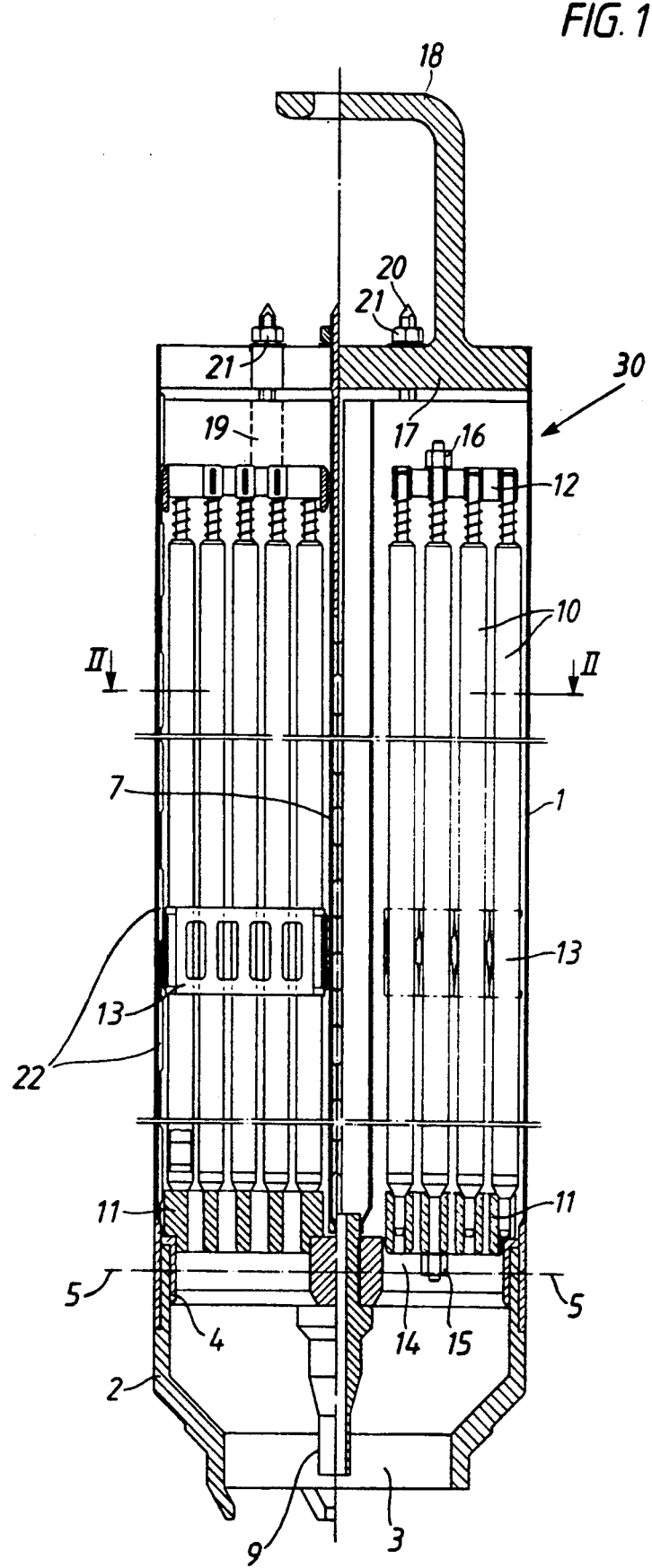
FIG. 1 shows fuel assembly, suitable for carrying out the method according to the invention, in a vertical section through the line I—I in FIG. 2.
Figure 2:
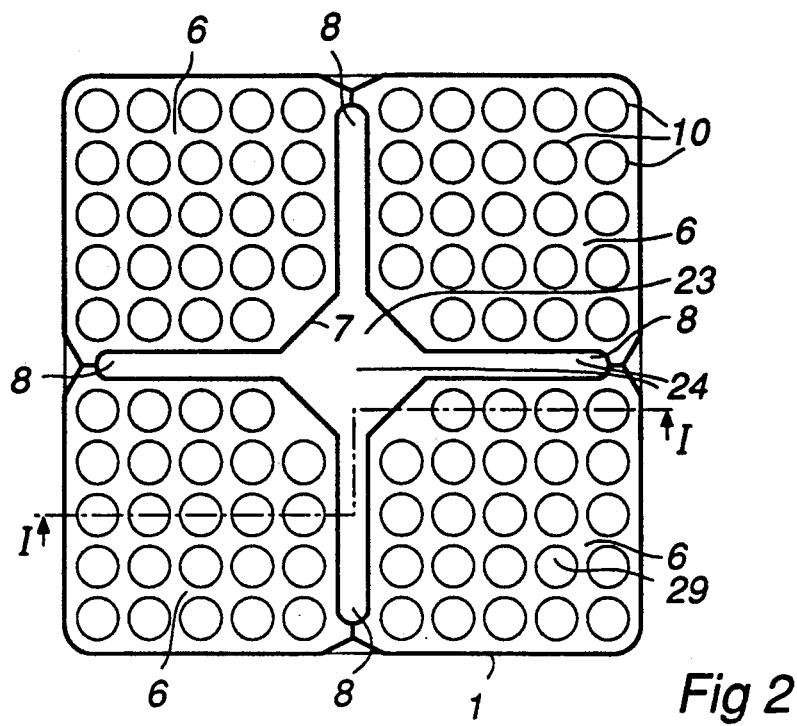
FIG. 2 shows the same fuel assembly in a view perpendicular to a horizontal plane through the line II—II in FIG. 1, FIG. 3 schematically shows a horizontal section of a whole reactor core.

The fuel assembly 30 shown as example and illustrated in FIGS. 1 and 2, has a fuel channel 1 of substantially square cross section. The fuel channel surrounds, with no mentionable play, an upper square portion of a bottom part 2 with a circular, downwardly-facing inlet opening 3 for cooling water and moderator water. Besides supporting the fuel channel 1, the bottom part 2 also supports a supporting plate 4. At its lower part the fuel channel 1 has a relatively thick wall portion, which may be fixed to the bottom part 2 and the supporting plate 4 by several horizontal bolts, indicated by dash-dotted lines 5. The fuel channel is divided into four vertical parts 6 with a hollow, channel-forming support member 7, which is secured to the four walls of the fuel channel. The channel-forming support member consists of four hollow wings 8 and a hollow enlarged cruciform centre 23 and forms a vertical channel 24 of cruciform cross section. At its lower part the channel 24 is connected to an inlet tube 9 for moderator water. The four vertical parts 6 form sub-assemblies each containing its own bundle of fuel rods 10 arranged in a symmetrical lattice containing 5x5 rods, each bundle having a reduced corner portion in such a way that, from a square lattice of uniformly distributed fuel rods, one rod has been removed in one corner. Each sub-assembly is arranged with a grid-like bottom tie plate 11, a grid-like top tie plate 12 and a plurality of spacers 13. The fuel channel 1, the channel-forming member 7 and the spacers 13 may be made of a zirconium alloy such as Zircaloy 4. The four bottom tie plates 11 are supported by the supporting plate 4 and they are each partially inserted into a respective square hole 14 in the supporting plate. In each sub-assembly at least one of the fuel rods may be made with relatively long threaded end plugs, the lower end plug being passed through the bottom tie plate 11 and provided with a nut 15, the upper end plug being passed through the top tie plate 12 and provided with a nut 16. A fuel rod 10 consists of a number of circularly-cylindrical pellets of uranium dioxide stacked on top of each other and enclosed in a cladding tube of Zircaloy-2.

An upper end portion of the fuel channel 1 surrounds a lifting plate 17 which partially makes contact with the inner wall surface of the fuel channel. A lifting handle 18 is connected to the lifting plate 17 and together forms a lifting member of steel cast in one piece. The lifting plate 17 is fixed to the channel-formed support member 7 by inserting, for example, vertical bars 19 into respective wing parts 8 of the support member 7 and securing them thereto. At the top each bar 19 has a vertical, bolt-like portion 20, which is passed with a play through a corresponding hole in the mid-portion of the lifting plate and provided with a nut 21. As is clear from the figure, the fuel channel 1 can be provided with indentations 22, intermittently arranged in the longitudinal direction, to which the channel-formed support member is secured.

Figure 3:
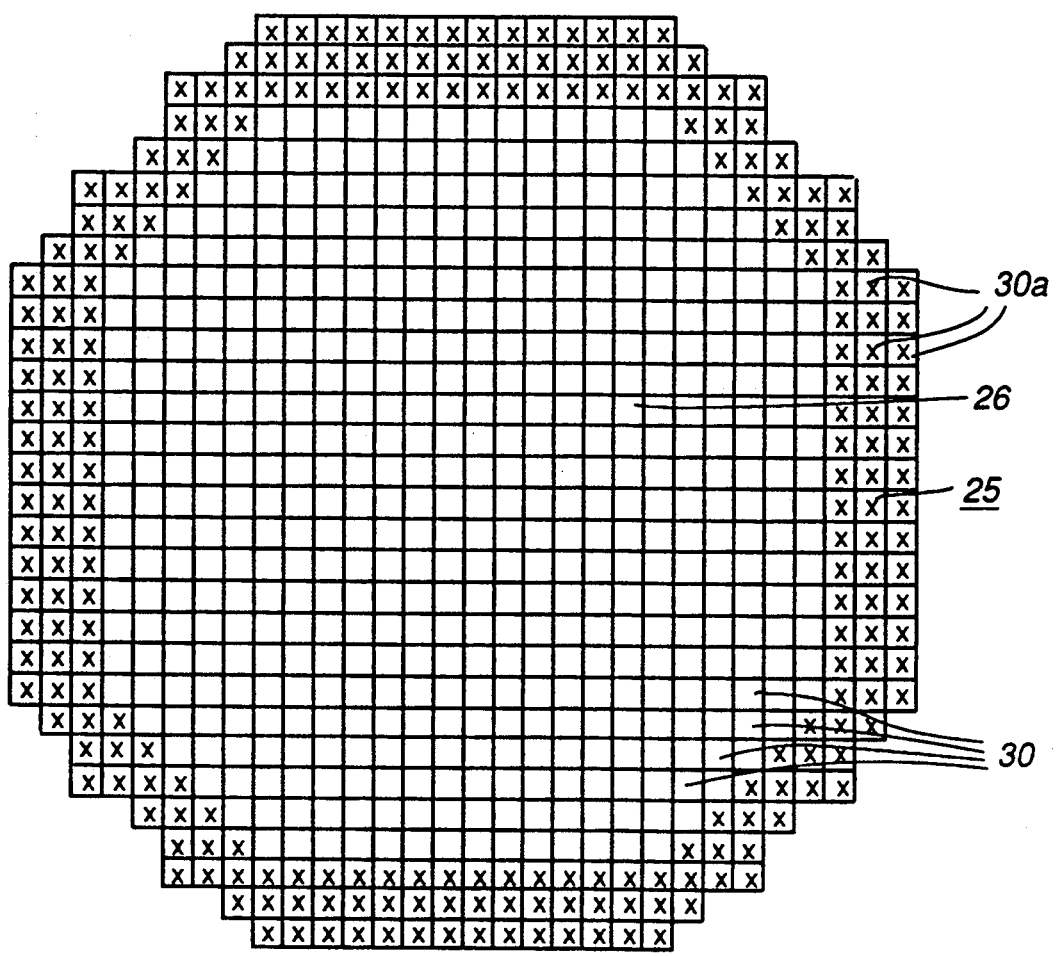

The reactor core schematically illustrated in FIG. 3 only shows fuel assemblies 30 between water gaps and control rod positions between them in the core are not shown. Fuel assemblies in an edge zone 25 located furthest out in the core are marked by crosses and are designated 30a. Inside thereof, the core has a central zone which is designated 26. In the exemplified case, the core has 746 fuel assemblies with a contemplated final burnup of more than 40 MWd/kgU.

Figure 4:
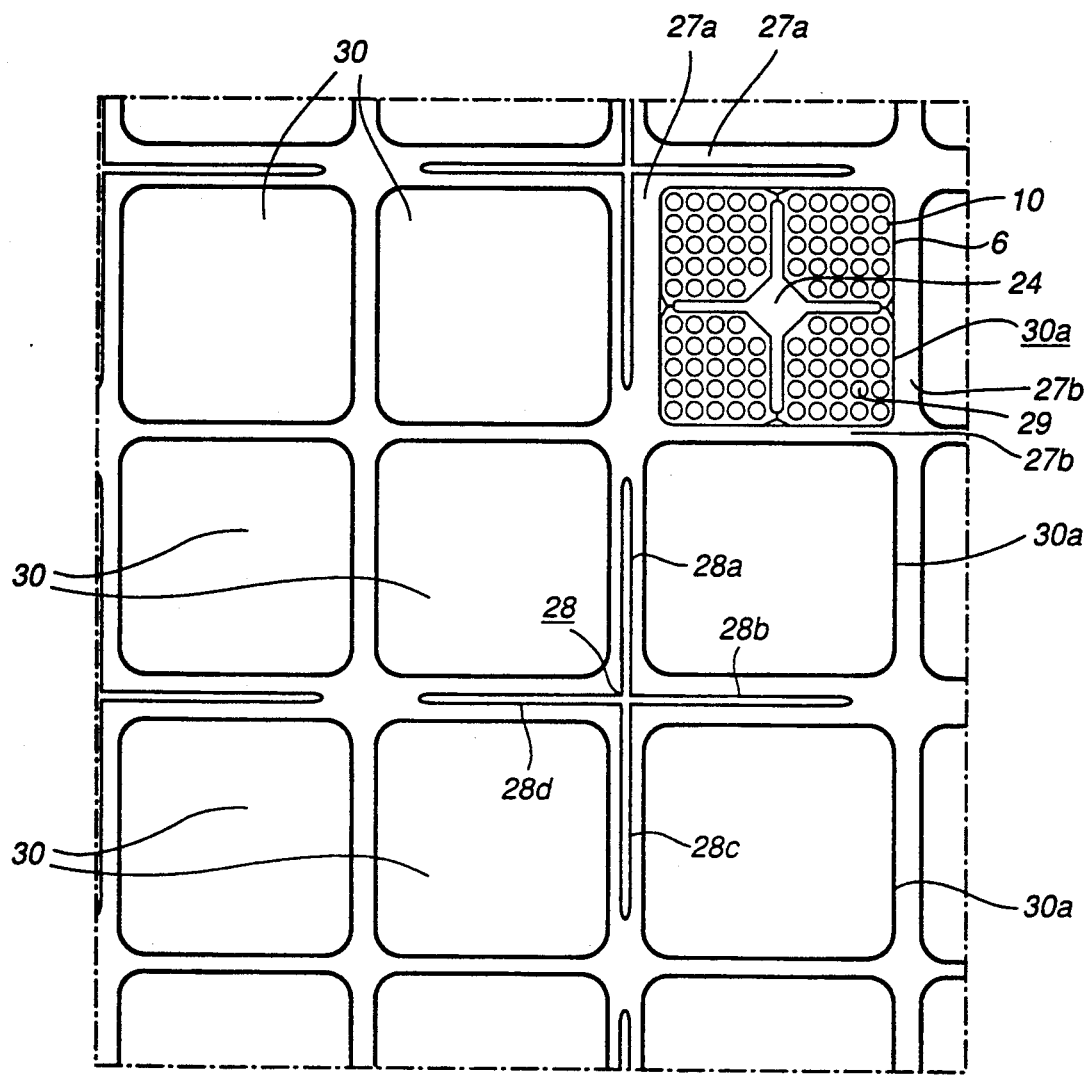
FIG. 4 shows a horizontal section of part of a reactor core on an enlarged scale.

FIG. 4 shows a small part of the reactor core according to FIG. 3. The section contains 9 whole fuel assemblies 30, 30a of the kind illustrated in FIGS. 1 and 2. Of the fuel assemblies, only one is shown in detail, the other ones only as empty squares. The spaces between the fuel rods 10 within each sub-assembly 6 are traversed by water, as is the channel 24. The gaps 27a and 27b between the fuel assemblies are also traversed by water. The gaps 27a where control rods 28 can be inserted are wider than the gaps 27b where no control rods can be inserted. One or more of the fuel rods may be replaced by a non-energy producing rod. Thus, for example, the rods 29 (FIGS. 2 and 4) may be replaced by a solid or water-filled rod of Zircaloy-2. The control rods 28 have blades 28a, 28b, 28c and 28d which form a perpendicular cross. Of the whole fuel assemblies in the shown part of the core, three, designated 31a, are included in the edge zone 25 and there in a row of assemblies which is located inside two rows of assemblies located furthest out in the core, and six, designated 30, in rows of assemblies located inside of the latter, that is, in the central zone 26.

Figure 5:
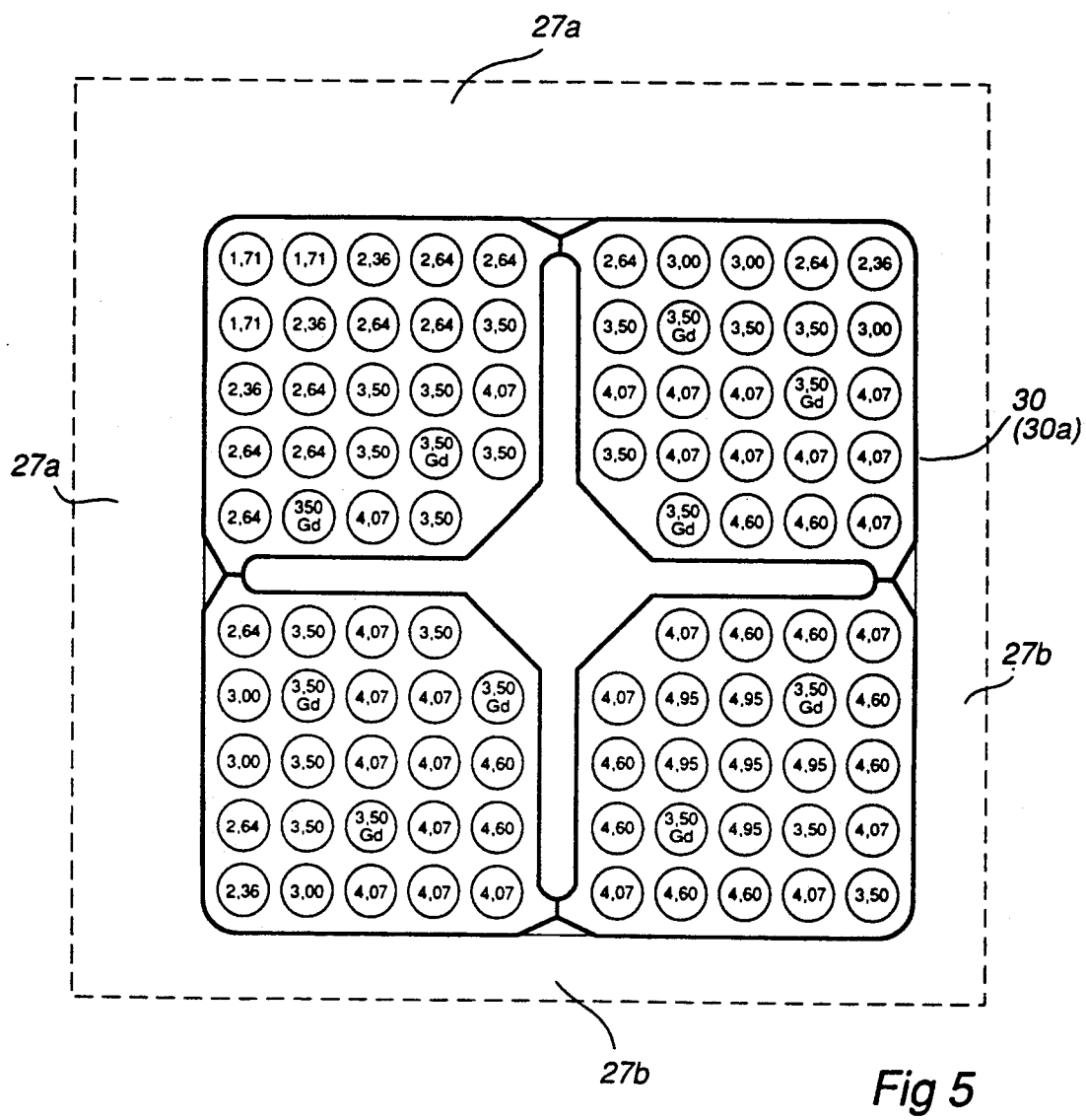
FIG. 5 shows a fuel assembly according to FIG. 1, in which the initial content of fissionable material is stated for each fuel rod included therein.

When composing a fuel assembly, fuel rods with different enrichment contents of fissile material in the different positions are used. FIG. 5 illustrates an example of a fresh fuel assembly for use within the whole core when carrying out the present invention. The figures indicated in the fuel rods constitute the initial content of U 235 in the respective fuel rod expressed as a percentage of the initial weight of uranium in the fuel. Eight different enrichment contents are used, namely, 1.71%, 2.36%, 2.64%, 3.00%, 3.50%, 4.07%, 4.60% and 4.95%. In addition, rods with an enrichment content of 3.50% are used together with gadolinium oxide in a content of 6.30%, also calculated on the basis of the initial weight of uranium. The latter rods are designated 3.50 Gd in FIG. 5. To show the position of the assembly in relation to the water gaps 27a and 27b, these are marked with dashed lines. The mean enrichment in the fresh assembly amounts to 3.628%. Each fuel assembly is oriented in such a way in the core that the corner fuel rod with the enrichment 1.71% is located at the crossing of the wide water gaps 27a, that is, nearest the centre line of a control rod position.

Figure 6:
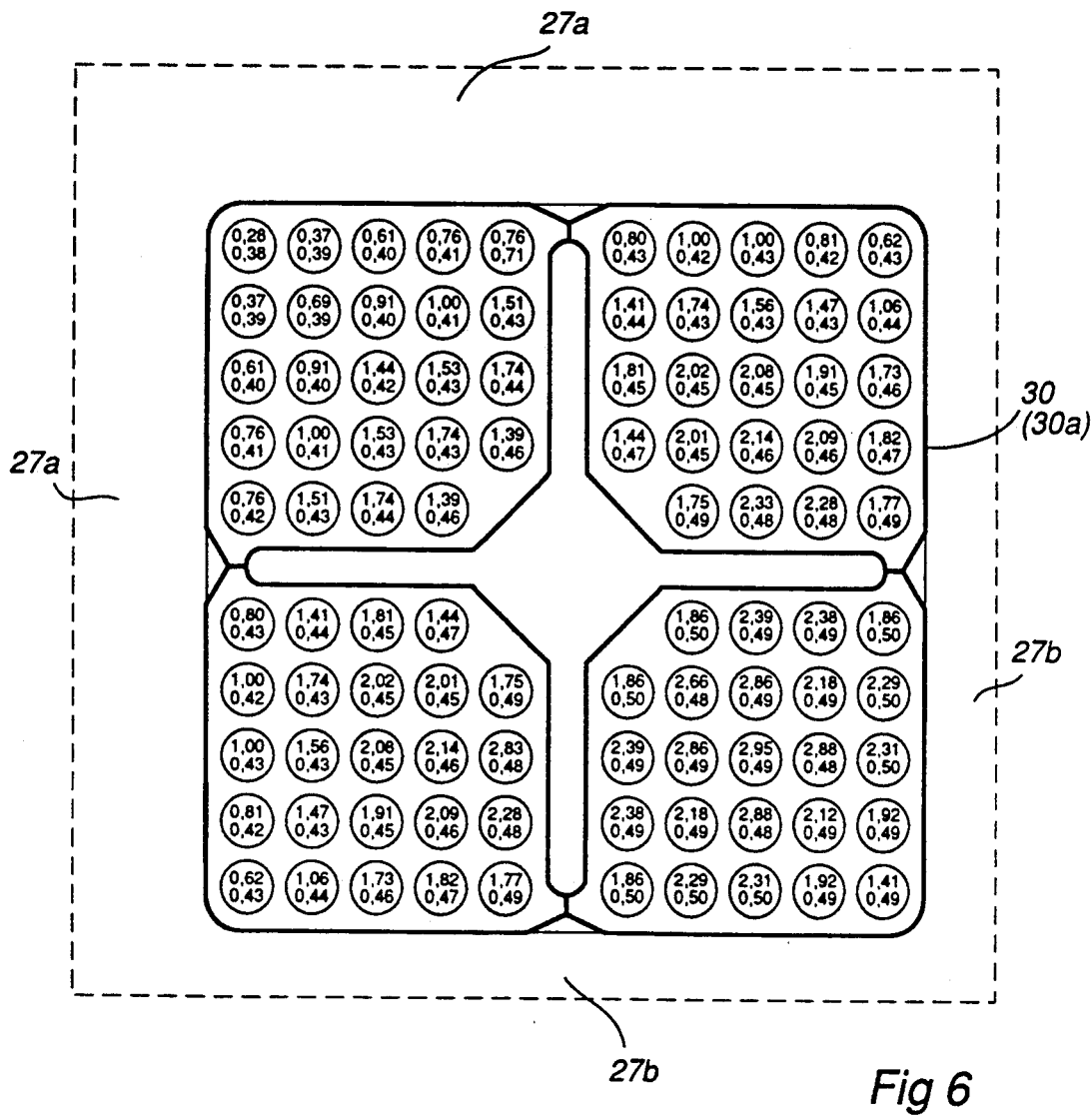
FIG. 6 shows the same fuel assembly as in FIG. 5 after 24 months operation of the reactor.
Figure 7:
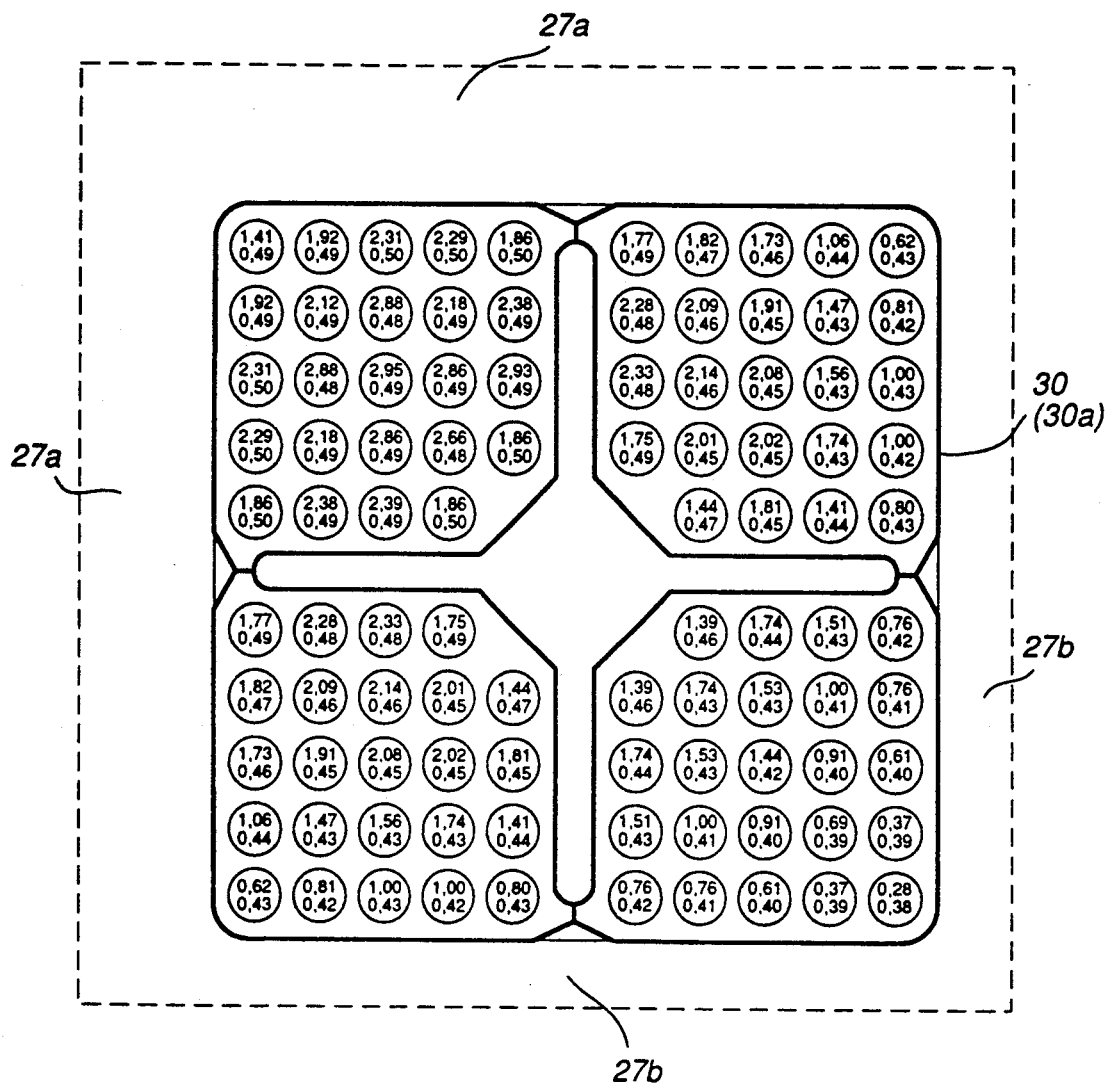
FIG. 7 shows the same fuel assembly as in FIG. 6 after turning 180° around the centre line of the fuel assembly.

When the reactor in an exemplified case has been in operation for about 24 months, it is shut down and a partial recharge of the reactor is carried out. 240 of the fuel assemblies are then replaced by fresh assemblies. These are placed, with some exceptions, in the central zone 26 (FIG. 3). Some of the replaced assemblies are relocated in the core, partly within the central part and partly by removal to the edge zone 25. The assemblies which are used during the completed operating cycle and which are within or are moved to the edge zone have high or relatively high burnups, such as around 20 MWd/kgU. At least the main part, that is, at least more than 50% thereof, ar turned 180° around their own axes according to the present invention. In the exemplified case, 228 assemblies are turned. The assembly which is shown in FIG. 5 and which maintains its position in the core exhibits, after the completed operating cycle, an enrichment distribution as shown in FIG. 6. The means enrichment of the assembly amount to 1.64% U 235 and about 0.64% fissile plutonium. The burnup amounts to 22 MWd/kgU. FIG. 7 illustrates the same assembly after the turning. After an additional operating cycle of 24 months, the means enrichment in the assembly illustrated in FIG. 7 is 0.81% U 235 and about 0.45% fissile plutonium. The burnup is then about 36 MWd/kgU. In FIGS. 6 and 7 the enrichment content of U 235 is indicated in the upper and the enrichment content of fissile plutonium in the lower row in each fuel rod; all figures relate to contents in percentage by weight.

Figure 8:
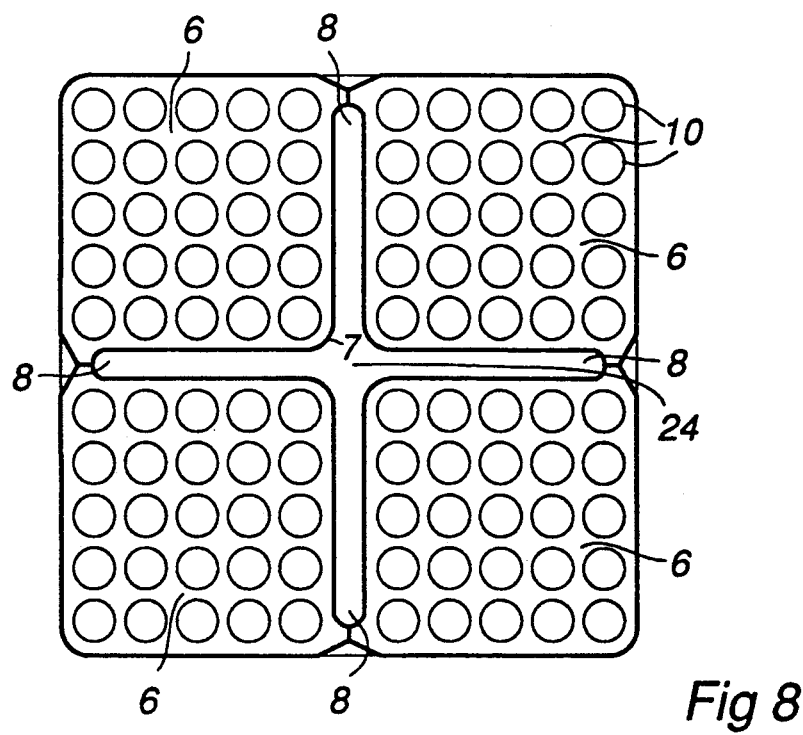
FIG. 8 shows a horizontal section of a fuel assembly of a different kind from that in FIGS. 1-3.

FIG. 8 shows a cross section of another fuel assembly with four vertical sub-assemblies 6, which are separated by a vertical water channel 24 of substantially cruciform cross section. Each sub-assembly consists of 25 fuel rods 10 and any non-energy producing rods occurring, arranged in a lattice of 5×5 rods. Also such an assembly is well suited for use according to the present invention, as well as, inter alia, the above-mentioned fuel assemblies containing 9×9, 10×10 and 11×22 fuel rods.

I claim:

1. A method for operation of a boiling water nuclear reactor having a reactor core comprising vertical fuel assemblies of substantially square cross section arranged in a lattice, with each fuel assembly included in two rows of fuel assemblies perpendicular to each other and separated by intermediate water gaps, and wherein each fuel assembly comprises two vertical perpendicular sides, each facing a larger width water gap than the other opposite two vertical perpendicular sides face, wherein the steps comprise operating the reactor for a cycle of at least two years, wherein said reactor has an edge zone comprising the three outermost fuel assembly rows;

relocating some fuel assemblies used during the operating cycle outwardly away from the core axis and into the edge zone;

turning the majority of edge zone fuel assemblies use during the operating cycle, which were located in said edge zone during the operating cycle or which after the cycle have been moved outwardly into said edge zone, 180 degrees around their vertical center line;

inserting the turned fuel assemblies in the edge zone in their turned positions; and operating the reactor for another cycle.

2. The method according to claim 1, further including the steps of turning the fuel assemblies during partial recharge of the reactor after an operating cycle;

replacing some of the fuel assemblies used during the operating cycle with fresh fuel assemblies; and relocating some fuel assemblies into new core positions.

3. A method according to claim 1, wherein each fuel assembly comprises four vertical sub-assemblies which are separated by a vertical water channel of substantially cruciform cross section.

4. A method according to claim 3, wherein each sub-assembly comprises 25 fuel rods and any non-energy producing rods occurring, arranged in a lattice of 5×5 rods.

5. A method according to claim 3, wherein each sub-assembly comprises 24 fuel rods and any non-energy producing rods occurring, arranged in a lattice of 5×5 rods, whereby that rod is removed which is located nearest the centre of the cruciform water channel while forming an enlarged centre in the water channel.

* * * * *